United States Patent [19]

Banno et al.

[11] Patent Number: 5,570,200

[45] Date of Patent: Oct. 29, 1996

[54] VIDEO DISK PLAYER COMPRISING A SIGNAL CIRCUIT FOR SELECTING ONE OF A VIDEO DATA SIGNAL AND A LUMINANCE SIGNAL AS AN OUT SIGNAL

[75] Inventors: Tutomu Banno; Junichi Nakata, both of Saitama, Japan

[73] Assignee: Pioneer Electronic Corporation, Tokyo, Japan

[21] Appl. No.: 272,454

[22] Filed: Jul. 11, 1994

Related U.S. Application Data

[63] Continuation of Ser. No. 911,036, Jul. 9, 1992, Pat. No. 5,369,498.

[30] Foreign Application Priority Data

Oct. 4, 1991 [JP] Japan ................................ 3-257986

[51] Int. Cl.[6] ........................................................ H04N 5/781
[52] U.S. Cl. ...................................................... 386/45; 386/45
[58] Field of Search ........................................ 358/310, 335, 358/342, 329; 348/461, 589, 665; 360/33.1, 27, 14.3; H04N 5/781, 9/78

[56] References Cited

U.S. PATENT DOCUMENTS

| | | | |
|---|---|---|---|
| 4,409,626 | 10/1983 | Ferguson et al. | 358/242 |
| 4,751,588 | 6/1988 | Tsujimura | 358/342 |
| 4,831,443 | 5/1989 | Heinz | 348/665 |
| 4,858,030 | 8/1989 | Oku et al. | 358/342 |
| 4,947,264 | 8/1990 | Narusawa | 358/347 |
| 5,097,348 | 3/1992 | Suetaka | 358/335 |

FOREIGN PATENT DOCUMENTS 3933951  4/1991  Germany .

Primary Examiner—Tommy P. Chin
Assistant Examiner—Huy Nguyen
Attorney, Agent, or Firm—Finnegan, Henderson, Farabow, Garrett & Dunner, L.L.P.

[57]  ABSTRACT

A video disk player includes a memory for storing a video data signal, a Y/C separator for separating the video data signal stored in the memory means into a luminance signal and a chrominance signal, a sync generator for generating sync signals, a selecting circuit for receiving the luminance signal and the video data signal and for selecting one of the luminance signal and the video data signal as an output signal, the selecting circuit selecting the video data signal as the output signal during a selected horizontal scan period, and a mixer for mixing the sync signals with the output signal and the chrominance signal.

4 Claims, 4 Drawing Sheets

VIDEO DISK PLAYER COMPRISING A SIGNAL CIRCUIT FOR SELECTING ONE OF A VIDEO DATA SIGNAL AND A LUMINANCE SIGNAL AS AN OUT SIGNAL

This is a continuation Ser. No. 07/911,036, filed Jul. 9, 1992, U.S. Pat. No. 5,369,498.

BACKGROUND OF THE INVENTION

1. Field of the Invention

The present invention relates to a video disk player for reproducing video data signals from a video disk such as a laser video disk and, more specifically, to a video disk player including a special-reproduction signal processor circuit for reproducing a video data signal containing caption data for multiplexing characters.

2. Discussion of the Related Art

With variegation of video information, caption data, which is used for displaying character text on a display screen, is often superimposed on a video data signal. Video disk players have been developed which include special-reproduction signal processor circuits that can process such a video data signal containing caption data.

An example of a special-reproduction signal processor circuit used in a conventional video disk player, which stores input video data signals and makes special reproductions, such as frame feed, using the stored video data signals, is shown in FIG. 1. As shown in FIG. 1, the special-reproduction processor circuit comprises an A/D converter 1, memory 2, Y/C separator 3, D/A converters 4a and 4b, mixers 5a and 5b, sync generator 6, memory controller 7, adder 8, and D/A converter 9.

A video data signal containing caption data, which has been read from a video disk (not shown) and demodulated, is converted into a digital signal by A/D converter 1 and stored into memory 2. Memory 2 is capable of storing at least one field of video data. The operation of reading video data from and writing video data in the memory 2 is performed under control of memory controller 7 which produces read and write signals R and W, respectively. The video data signal read from memory 2 is applied to Y/C separator 3 where it is separated into a luminance signal Y and a chrominance signal C. Luminance signal Y and chrominance signal C are converted into analog signals by D/A converters 4a and 4b, respectively.

In order to minimize the capacity required for the memory 2, the sync signals of the video data signal stored in and, thus, read from memory 2 are removed. To add the sync signals back to the video data signal, mixers 5a and 5b mix reference sync signals, i.e., reference vertical sync signal V and reference horizontal sync signal H, that are generated by sync generator 6 with luminance signal Y and chrominance signal C to produce luminance signal Y' and chrominance signal C'. Reference vertical and horizontal sync signals V and H generated by sync generator 6 are also applied to memory controller 7 and used by memory controller 7, for example, to time the resetting operation of the readout address signal.

Luminance signal Y' and chrominance signal C', each of which includes reference vertical sync signal V and reference horizontal sync signal H, are applied to output terminals Y'-OUT and C'-OUT, respectively. These signals are also applied to adder 8 where they are added together to produce a composite video data signal A. It should be noted that the video data signal read from memory 2 is converted to an analog signal by D/A converter 9 to produce a composite video data signal B.

The details of Y/C separator 3 are shown in FIG. 2. As shown in FIG. 2, Y/C separator 3 is based on a three-line comb filter and comprises 1H delay circuits 32 and 33, ¼ coefficient circuits 31 and 35, ½ coefficient circuit 34, adders 36 and 37, and subtractor 38. It should be understood that Y/C separator 3 operates in connection with 1H delayed signals. Accordingly, luminance signal Y and chrominance signal C produced by Y/C separator 3 are phase-shifted by 1H with respect to the video data signal read from memory 2.

Various types of data, such as address data, control code data for controlling the player, caption data for displaying a character text on the display screen, etc., are located on a part of the vertical flyback period of the video disk. Of those types of data, the address and control code data, which are processed within the player, are separated from the video data signal before it is separated into Y and C signals. The caption data is processed in another video device (not shown), e.g., a TV set, including a demodulator, called a caption decoder. The caption decoder, therefore, separates the caption data from the video data signal after the video data signal passes through the Y/C separator 3.

As noted above, in Y/C separator 3 of FIG. 2, luminance signal Y and chrominance signal C are phase-shifted by 1H from the input video data signal. Because of this, the caption decoder necessarily picks up, for separation, caption data at an incorrect location and fails to decode the caption data. There are several techniques, however, for solving this problem. One approach uses a delay circuit for delaying the generation of reference vertical sync signal V by 1H. Another approach involves controlling memory controller 7 to start the read operation by 1H earlier. These techniques, however, have certain drawbacks.

In the first technique, sync generator 6 uses a high frequency oscillator, usually N×3.58 Mhz. If this is 4fsc, for example, 910 stages of clock delay circuits are required for gaining a delay of 1H, because fsc=(455/2)×$f_R$. Use of such a great number of clock delay circuits is impractical.

In the second technique, in composite video data signal B shown in FIG. 1, the location where the caption data is superimposed appears 1H earlier than the location where the caption data would have been superimposed had the read operation not been started 1H earlier. The result will be a failure to decode the caption data.

SUMMARY OF THE INVENTION

Accordingly, an object of the present invention is a video disk player that can reliably reproduce caption data with a relatively simple circuit arrangement.

Another object of the present invention is a special-reproduction signal processor circuit that successfully solves the caption-data failure problems inevitably arising from use of a frame memory.

To achieve the foregoing objects, and in accordance with the purposes of the invention as embodied and broadly described here, a video disk player is provided comprising a memory for storing a video data signal, a Y/C separator for separating the video data signal stored in the memory into a luminance signal and a chrominance signal, the Y/C separator being of a comb filter type, a sync generator for generating sync signals, a selecting circuit for receiving the luminance signal and the video data signal and for selecting one of the luminance signal and the video data signal as an output signal, the selecting circuit selecting the video data signal as the output signal during a selected horizontal scan period, and a mixer for mixing the sync signals with the output signal and the chrominance signal.

With such an arrangement, in a specific horizontal scan period where the caption data is separated from the video data signal, the video data signal from which the caption data is separated is the composite video data signal before it is subjected to Y/C separation, not the video data signal after it is subjected to the same, viz., the video signal not containing the sync signals. Accordingly, no decode-failure of the caption data will occur. Preferably, the specific horizontal scan period is the 21Hth horizontal scan period.

To further achieve the foregoing objects, and in accordance with the purposes of the invention as embodied and broadly described here, a sync generator for use with a video disk player having a field memory, a Y/C separator for separating a video data signal stored in the field memory into a luminance signal and a chrominance signal, the Y/C separator being of a comb-filter type, a selecting circuit for receiving the luminance signal and the video data signal and for selecting one of the luminance signal and the video data signal as an output signal, the selecting circuit selecting the video data signal as the output signal during a selected horizontal scan period, and a mixer for mixing sync signals with the output signal and the chrominance signal, is provided comprising a sync signal generator for generating a reference vertical sync signal and a reference horizontal sync signal, a detecting circuit for detecting whether or not a field of a video data signal to be stored in the field memory is coincident with a field of a video data signal with which sync signals are to be mixed, and a shift circuit for shifting a timing of the generation of the reference vertical sync signal by the sync signal generator when the field of the video data signal to be stored in the field memory is not coincident with the field of the video data signal with which sync signals are to be mixed.

In the sync generator thus arranged, when the field of the video data to be stored into the memory is not coincident with that of the video data read out of the memory, the vertical sync signal is phase shifted by (½)H. The (½)H phase shift eliminates the noncoincidence of the fields of the video data before it is input to and after it is output from memory. Accordingly, the caption-data decode failure problem, which arises from use of the field memory, can be solved.

BRIEF DESCRIPTION OF THE DRAWINGS

The accompanying drawings, which are incorporated in and constitute a part of this specification illustrate presently preferred embodiments of the invention and, together with the general description given above and the detailed description of the preferred embodiments given below, serve to explain the objects, advantages and principles of the invention. In the drawings.

DETAILED DESCRIPTION OF THE PREFERRED EMBODIMENTS

Figure 1:
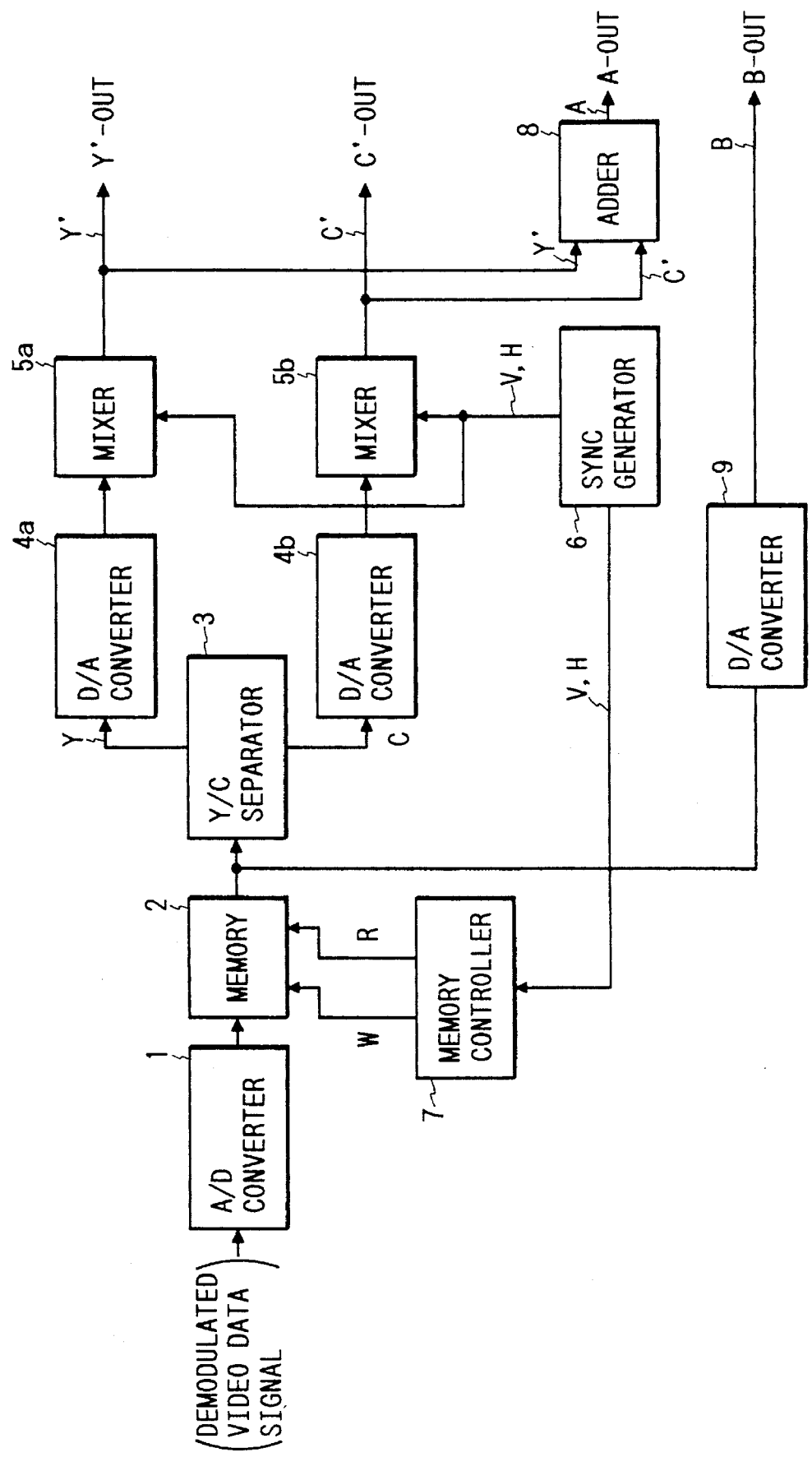
FIG. 1 is a block diagram of a conventional video disk player.
Figure 2:
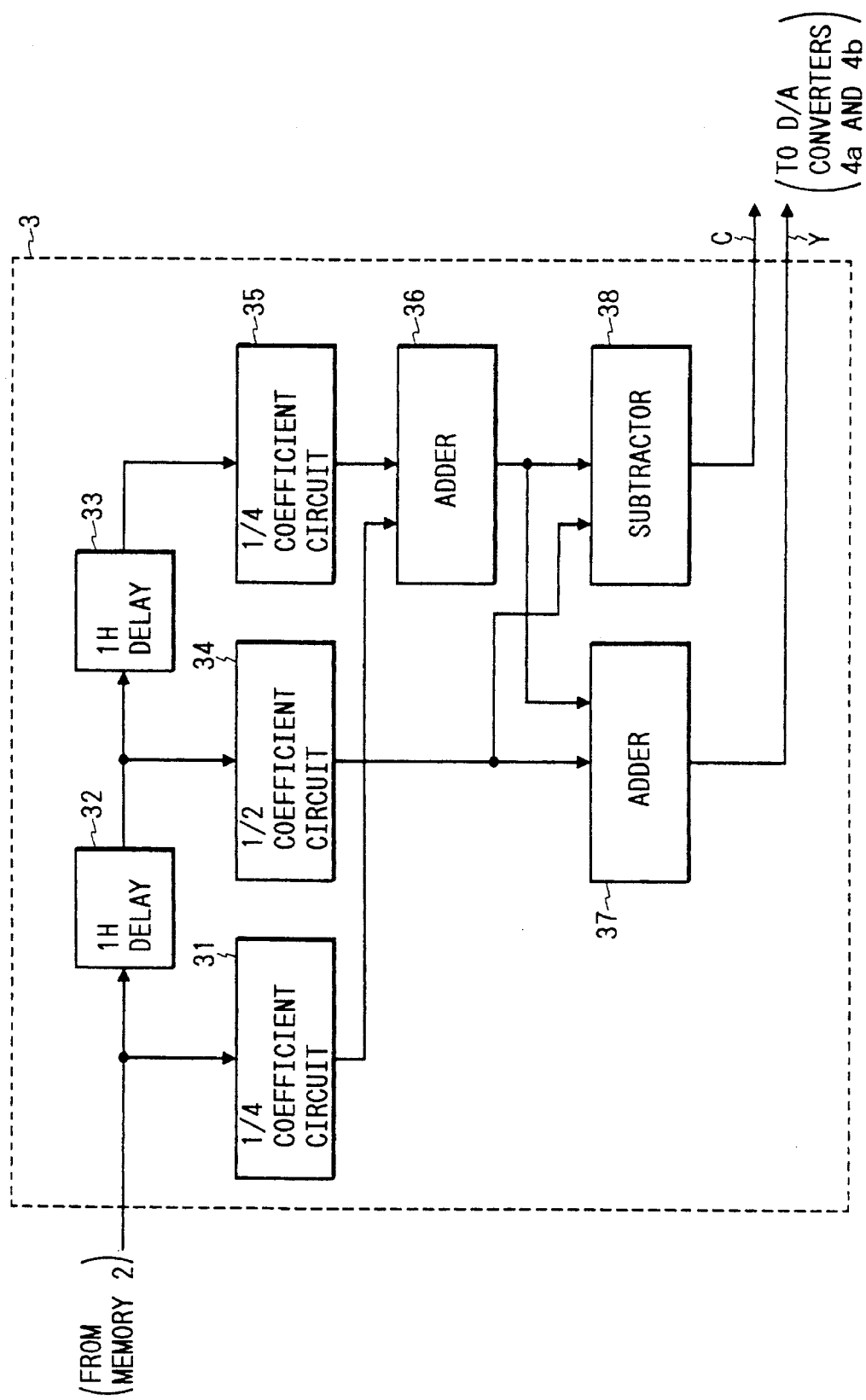
FIG. 2 is a block diagram of a Y/C separator used in the video disk player shown in FIG. 1.

Reference will now be made in detail to the presently preferred embodiments of the invention as illustrated in the accompanying drawings, in which like reference characters designate like or corresponding parts throughout the several drawings.

First Embodiment

Figure 3:
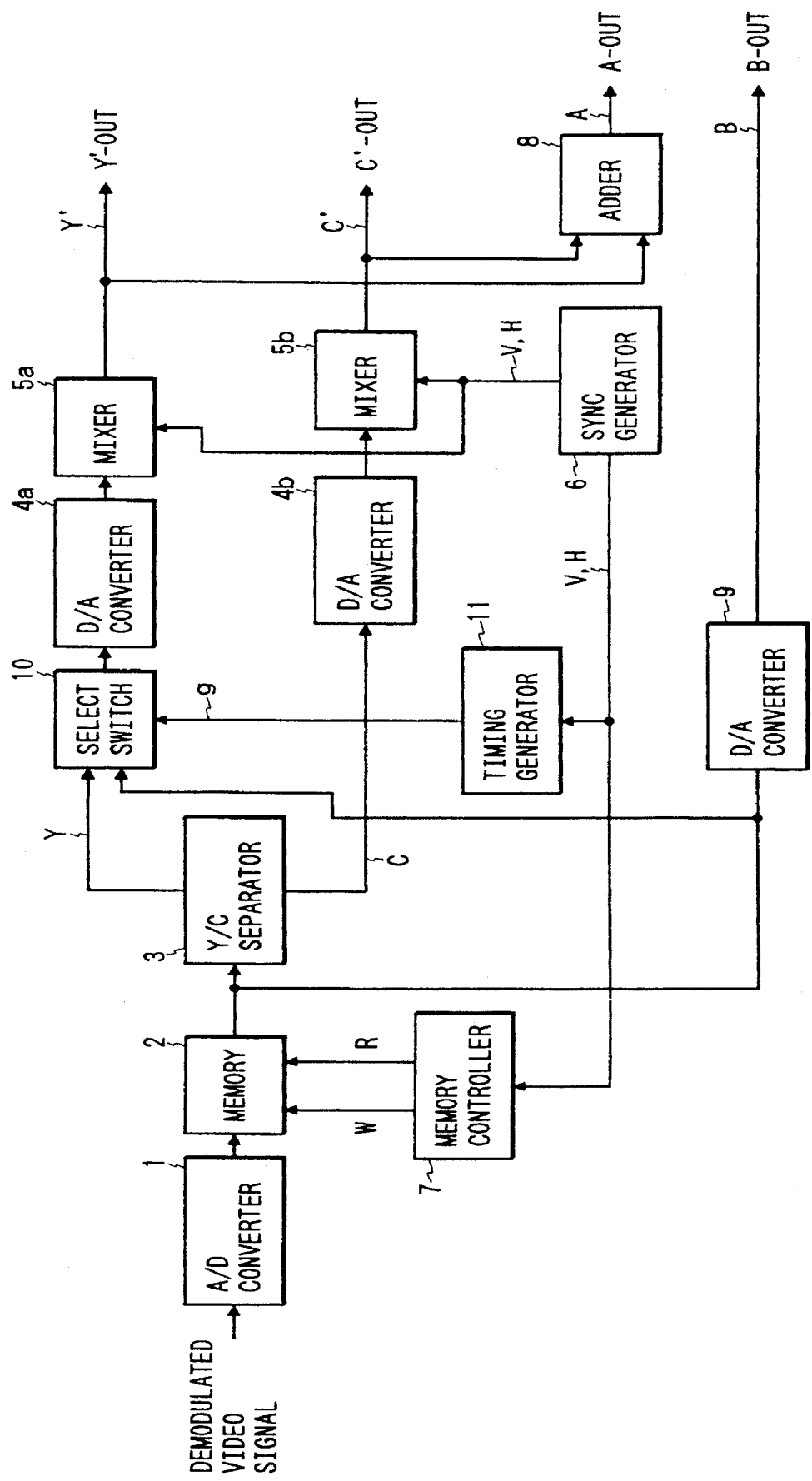
FIG. 3 is a block diagram of a portion of a special-reproduction signal processor circuit of a video disk player in accordance with a first embodiment of the present invention.

As shown in FIG. 3, there is provided a first embodiment of the present invention. It should be noted that the arrangement illustrated in FIG. 3 corresponds to a portion of a special-reproduction signal processor circuit of a video disk player. It should also be noted that the arrangement of FIG. 3 differs from that of FIG. 1 in that a select switch 10 and a timing generator 11 are additionally provided.

Timing generator 11 is reset by a reference vertical sync signal V generated by sync generator 6, starts a count operation in response to a reference horizontal signal H, also generated by sync generator 6, and generates a gate signal g, preferably, every 21H. Select switch 10 responds to gate signal g to switch the signal applied to D/A converter 4a between luminance signal Y out-put from Y/C separator 3 and the video data signal read from memory 2. With the cooperation of select switch 10 and timing generator 11, the input signal to D/A converter 4a is switched to the video data signal read from memory 2 only during the 21Hth horizontal scan period. Because the caption data is superimposed onto the video data signal exactly at the 21Hth period, an exact and reliable separation of the caption data can be ensured.

Next, operation of the first embodiment of the invention will be described.

A video data signal, which has been read from a video disk (not shown) and demodulated, is converted into a digital video data signal by A/D converter 1 and then stored into memory 2. The video data signal is then read from the memory 2 under control of memory controller 7 and supplied to Y/C separator 3. When the readout video data signal corresponds to the 21Hth horizontal scan period as the caption data superimposing location, timing generator 11 sends trigger signal g to select switch 10. Upon receipt of trigger signal g, select switch 10 selects the video data signal read from memory 2 as an input signal to allow only the 21Hth horizontal scan period video data signal to pass therethrough to D/A converter 4a. Because the video data signal selected does not pass through Y/C separator 3, it is not delayed by 1H and, hence, correctly provides the caption data.

Second Embodiment

The second embodiment of the present invention is directed to a solution to a problem which arises when memory 2 of the first embodiment comprises a field memory. For example, in a case where image data of a first field is stored in memory 2, and the sync signal to be inserted into the video data signal is contained in a second field, a decode-failure of the caption data occurs in the video disk player. In the second embodiment, however, the problem of the decode-failure is solved by shifting generation of reference horizontal sync signal H by (½)H.

Figure 4:
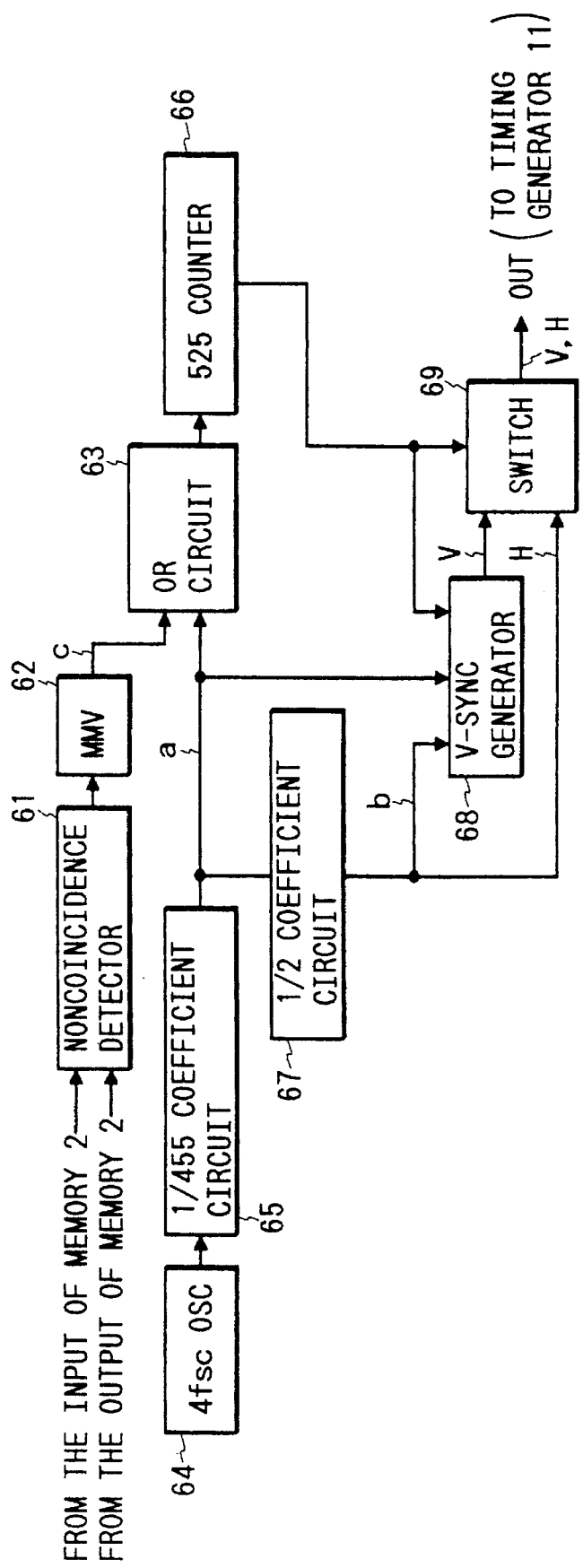
FIG. 4 is a block diagram of a sync generator that may be used in the special-reproduction signal processor circuit shown in FIG. 3 in accordance with a second embodiment of the present invention.

A circuit arrangement of a sync generator modified so as to implement the above idea is shown in FIG. 4. The arrangement of the video disk player into which the sync generator of FIG. 4 is incorporated is substantially the same as that of FIG. 3.

As shown in FIG. 4, the sync generator of the second embodiment comprises a noncoincidence detector 61, mono multivibrator (MMV) 62, OR circuit 63, 4fsc oscillator 64, 1/455 coefficient circuit 65, 525 counter 66, ½ coefficient circuit 67, V-sync generator 68, and switch 69. Noncoincidence detector 61 is followed by MMV 62 and the output of MMV 62 is connected to OR circuit 63. Further, 4fsc oscillator 64 is followed by 1/455 coefficient circuit 65, the output of 1/455 coefficient circuit 65 is connected to OR gate 63, and 525 counter 66 is connected to the output of the OR gate 63. The output of 1/455 coefficient circuit 65 is further connected to ½ coefficient circuit 67 and a V-sync generator 68. V-sync generator 68 is connected to the output of ½ coefficient circuit 67, the output of 1/455 coefficient circuit 65, and the output of 525 counter 66. Finally, switch 69 is connected to the output of ½ coefficient circuit 67, the output of 525 counter 66, and the output of V-sync generator 68.

In the sync generator thus arranged, noncoincidence detector 61 discriminates the field of the image data, or the video data signal, to be stored in memory 2 (FIG. 3), and determines whether or not the discriminated data is coincident with the field of the data read from memory 2, viz., the field which depends on the sync signal from the sync generator. To this end, a circuit for receiving the video data to be stored into memory 2 is connected between sync generator 6, more exactly noncoincidence detector 61, and an appropriate location, e.g., the input of memory 2, preceding to memory 2, although it is not depicted in FIG. 3 showing the special-reproduction signal processor circuit of the video disk player.

Another circuit for receiving the video data output from memory 2 is also provided between noncoincidence detector 61 and an appropriate location, e.g., the output of memory 2, succeeding to memory 2. Thus, the sync generator of the second embodiment is arranged such that noncoincidence detector 61 checks whether or not the field of the video data signal to be stored into memory 2 is in synchronism with the field of the video data signal to be subjected to the sync insertion processing and output, and when the fields are not coincident with each other, the generation of the reference vertical sync signal V is shifted by (½)H.

The output signal of 4fsc oscillator 64 is applied to 1/455 coefficient circuit 65 which forms a (½)H pulse a from the received signal. Further, ½ coefficient circuit 67 receives the output signal of 1/455 coefficient circuit 65 to form a 1H pulse b. V-sync generator 68 receives signals a and b from coefficient circuits 65 and 67, respectively, and forms an equivalent pulse and a reference vertical sync signal V. 525 counter 66 counts the (½)H pulse a and when its count reaches 525, it drives switch 69 which in turn operates to permit a reference vertical sync signal V from V-sync generator 68 to pass therethrough during a prescribed period (i.e., the period of the reference vertical sync signal V). During the remaining period, switch 69 operates so as to permit a 1H pulse signal, i.e., the reference horizontal signal H, to pass therethrough.

Figure 5:
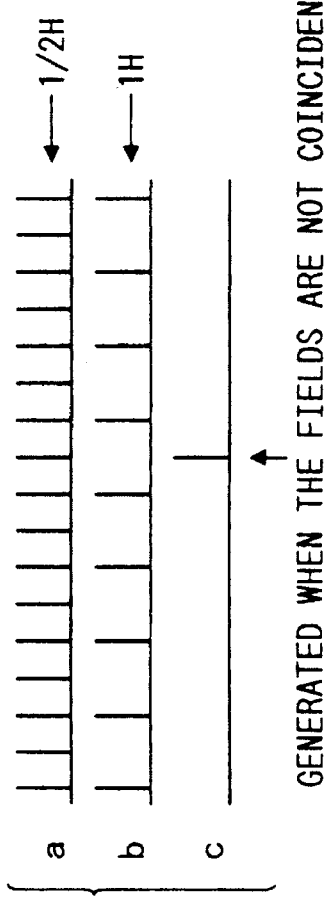
FIG. 5 is a timing chart illustrating the operation of the sync generator of FIG. 4.

When the field of the image data to be stored into memory 2 is not coincident with the field of the image data read therefrom, noncoincidence detector 61 triggers MMV 62, which in turn produces a one-shot pulse signal c. With the one-shot pulse, 525 counter 66 is forcibly incremented. If so done, 525 counter 66 counts 525 at the time point where it counts 524. As a result, the generation of reference vertical sync signal V is shifted by ½H. The timing relationships of pulses a, b, and c are shown in FIG. 5.

Immediately after the reference vertical sync signal V, the generation phase, or the timing of generation, of the horizontal signal H in the first field is different from that of the second field by (½)H. From the (½)H phase difference, the present field, the first field or the second field, can readily be known. This can be realized by arranging noncoincidence detector 61 so as to compare the field of the video data signal to be stored into memory 2 with the field of the video data signal to be subjected to the sync-insertion processing.

It is evident to those skilled in the art that the sync generator according to the second embodiment is also applicable for use in a conventional special-reproduction processor of a video disk player.

As described above, in the first embodiment of the present invention, during a specific horizontal scan period, a luminance signal output from a Y/C separator with a composite video data signal to be input to the Y/C separator before the luminance signal is output to a succeeding stage. In a specific horizontal scan period where the caption data is separated from the video data, the video signal from which the caption data is separated is the composite video data signal before it is subjected to Y/C separation, not the video data signal after it is subjected to the same, viz., a video signal not containing sync signals. Accordingly, no decode-failure of the caption data will occur. In addition, the specific horizontal scan period is, preferably, the 21Hth horizontal scan period.

In the second embodiment of the present invention, the sync generator may include phase shift circuitry for detecting whether or not the field of the video data signal to be stored into the field memory is coincident with the field of the video data signal to which the sync signals is to be inserted, and when both the fields are not coincident with each other, for shifting the phase of generating the reference vertical sync signal. When the field of the video data to be stored into the memory is not coincident with that of the video data read out of the memory, the vertical sync signal is phase shifted by (½)H. The (½)H phase shift eliminates the noncoincidence of the fields of the video data before it is input to the memory and after it is output therefrom. Accordingly, the caption-data decode failure problem which arises from use of a field memory can be prevented.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A video disk player comprising:

memory means for storing a video data signal read from a video disk, the video data signal stored in the memory means being devoid of any sync signals;

Y/C separating means for separating the video data signal stored in the memory means into a luminance signal and a chrominance signal;

sync signal generating means for generating sync signals;

timing generator means for setting a selection signal after counting a predetermined number of horizontal sync signals, and being reset for each occurrence of a vertical sync signal;

signal selection means, responsive to the selection signal generated by the timing generator means, for selecting the video data signal stored in the memory means as a first output signal when the selection signal is set, and for selecting the luminance signal from the Y/C separator means as a second output signal when the signal is not set; and mixing means for mixing the sync signals generated by the sync signal generating means with the first output signal from the signal selection means.

2. The video disk player according to claim 1, wherein the signal selection means includes:

gate signal generator means, responsive to the sync signals generated by the sync signal generating means, for generating a gate signal indicating a beginning of the predetermined horizontal scan period; and selecting means, responsive to the gate signal generated by the gate signal generator means, for selecting the video data signal stored in the memory means as the first output signal.

3. The video disk player according to claim 1, wherein the predetermined horizontal scan period is a 21Hth horizontal scan period.

4. The video disk player according to claim 1, wherein the Y/C separating means is a comb filter type separator.

* * * * *